United States Patent
Judson et al.

(10) Patent No.: US 12,504,754 B2
(45) Date of Patent: Dec. 23, 2025

(54) METHOD OF OPERATION FOR A FLEET OF VEHICLES

(71) Applicant: Polaris Industries Inc., Medina, MN (US)

(72) Inventors: Christopher T. Judson, North Branch, MN (US); Christopher J. Hurd, Hugo, MN (US); Amber P. Malone, Blaine, MN (US); Scott D. Taylor, Blaine, MN (US); John CB Stockman, Excelsior, MN (US); Steven M. Schiebel, Osceola, WI (US); Brent A. Erspamer, Blaine, MN (US)

(73) Assignee: Polaris Industries Inc., Medina, MN (US)

(*) Notice: Subject to any disclaimer, the term of this patent is extended or adjusted under 35 U.S.C. 154(b) by 552 days.

(21) Appl. No.: 17/700,833

(22) Filed: Mar. 22, 2022

(65) Prior Publication Data

US 2022/0308576 A1 Sep. 29, 2022

Related U.S. Application Data

(60) Provisional application No. 63/165,075, filed on Mar. 23, 2021.

(51) Int. Cl.
| | |
|---|---|
| G05D 1/00 | (2024.01) |
| B60W 40/08 | (2012.01) |
| B60W 50/14 | (2020.01) |
| G08G 1/00 | (2006.01) |
| H04W 4/021 | (2018.01) |

(52) U.S. Cl.
CPC ........... *G05D 1/0027* (2013.01); *B60W 40/08* (2013.01); *B60W 50/14* (2013.01); *G08G 1/207* (2013.01); *H04W 4/021* (2013.01); *B60W 2050/146* (2013.01); *B60W 2510/22* (2013.01)

(58) Field of Classification Search
CPC .... G05D 1/0027; B60W 40/08; B60W 50/14; B60W 2050/146; B60W 2510/22; G08G 1/207; H04W 4/021
See application file for complete search history.

(56) References Cited

U.S. PATENT DOCUMENTS

| | | | |
|---|---|---|---|
| 2020/0135033 A1* | 4/2020 | Switkes | G08G 1/22 |
| 2021/0188293 A1* | 6/2021 | Taveira | B60W 50/0098 |
| 2022/0289240 A1* | 9/2022 | Ucar | G08G 1/163 |

* cited by examiner

*Primary Examiner* — Scott A Browne
*Assistant Examiner* — Terry C Buse

(57) ABSTRACT

A method for operating a fleet of vehicles is provided comprising receiving, from a first vehicle of the fleet of vehicles, first vehicle state information comprising a location of the first vehicle and receiving, from a second vehicle of the fleet of vehicles, second vehicle state information comprising a location of the second vehicle. The method further comprises generating a display comprising a first vehicle representation based on the location of the first vehicle, and a second vehicle representation based on the location of the second vehicle, and controlling the operation of the second vehicle within an area defined by an overlap of a second geofence based upon an energy estimate of the second vehicle with a first geofence based upon the first vehicle.

8 Claims, 8 Drawing Sheets

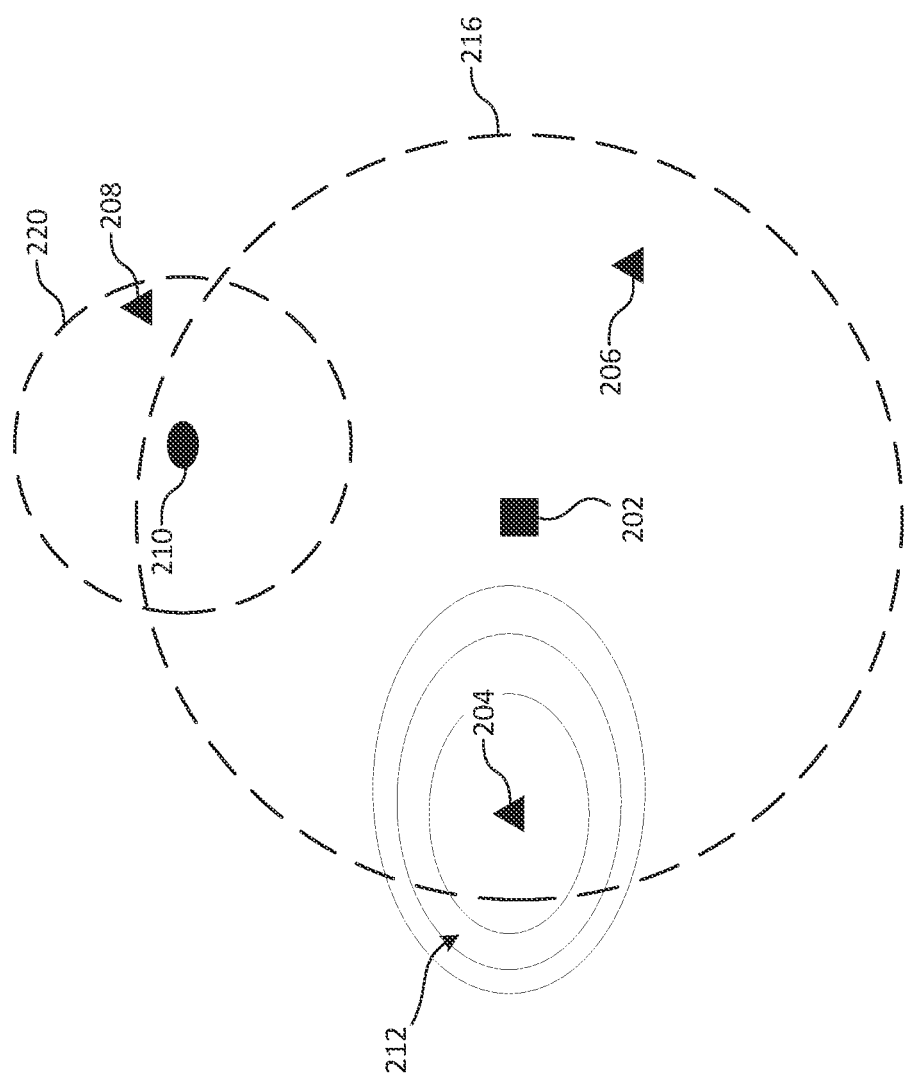

METHOD OF OPERATION FOR A FLEET OF VEHICLES

RELATED APPLICATIONS

The present disclosure is related to U.S. Provisional Patent Application No. 63/165,075, filed Mar. 23, 2021, titled MULTI-VEHICLE COMMUNICATION AND CONTROL SYSTEMS AND METHODS, docket PLR-886-29639.01P-US, the entire disclosures of which are expressly incorporated by reference herein.

TECHNICAL FIELD

The present disclosure is related to systems and methods for control of vehicles within a vehicle fleet and communication between vehicles within a fleet of vehicles.

BACKGROUND

In some instances, multiple vehicles may be used in conjunction with one another. However, controlling the operation of multiple vehicles and managing communication among vehicle operators may be difficult, especially in instances where there are limited communication technologies available.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to multi-vehicle communication and control systems and methods. In examples, a fleet of vehicles comprises one or more hub vehicles and remote vehicles, where a hub vehicle aggregates and disseminates information among remote vehicles. For example, the hub vehicle may specify a geofence and/or any of a variety of other vehicle configuration information, which may be provided to remote vehicles accordingly. Further, a remote vehicle may monitor a power source state and ensure that the remote vehicle does not travel outside of a range to the hub vehicle, thereby reducing instances where the remote vehicle has traveled too far to be replenished.

The hub vehicle may also facilitate cross-vehicle communication between operators. For example, the hub vehicle may relay communications among other vehicles of the fleet. In other examples, the hub vehicle may provide task management functionality, where a shared task list is synchronized among the vehicles, thereby enabling operators of the vehicles to view task statuses, add tasks, and remove tasks, among other functionality.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 2A-2B illustrate conceptual diagrams of a worksite in which aspects of the present disclosure may be practiced.

DETAILED DESCRIPTION

Figure 1:
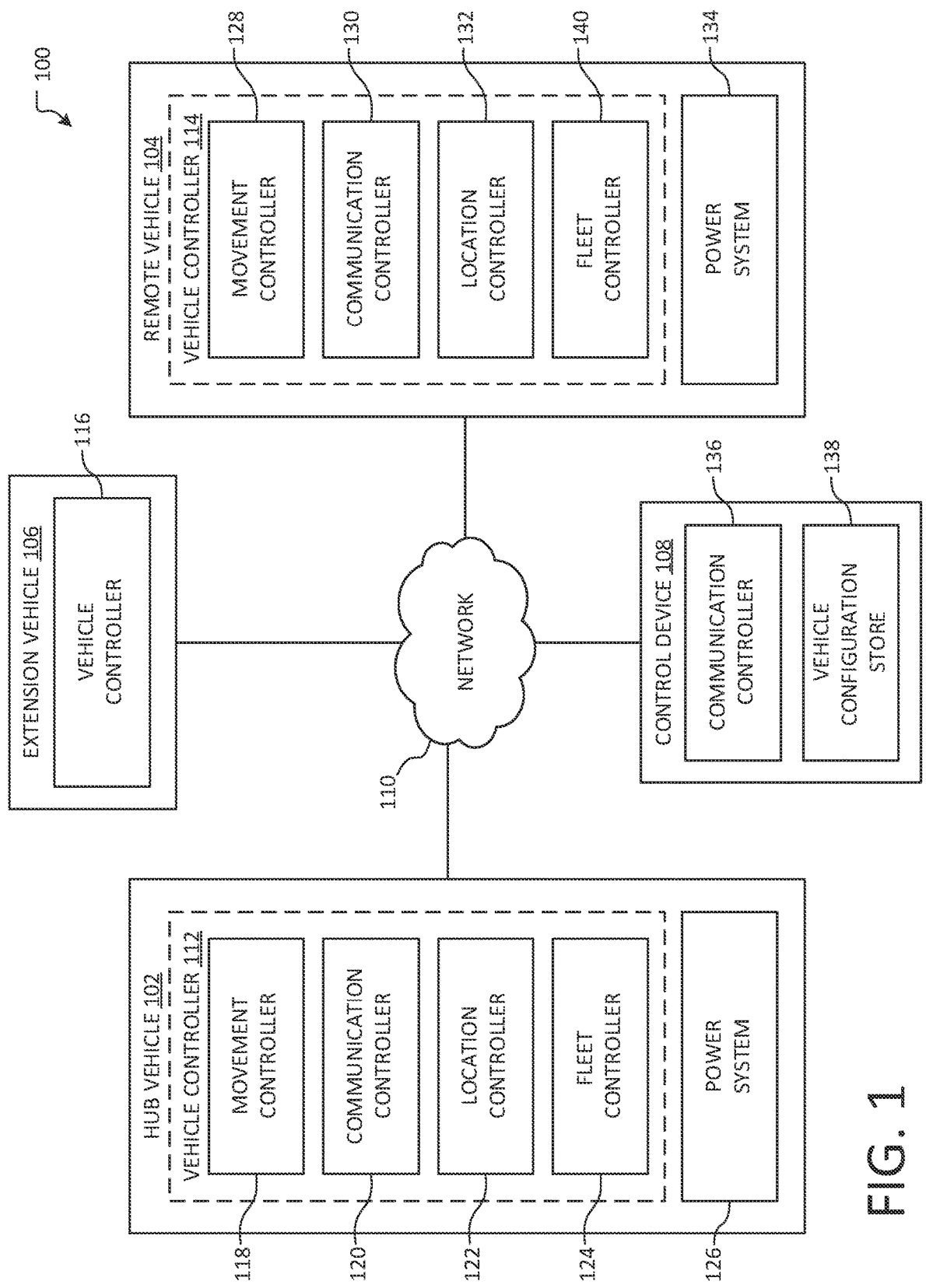
FIG. 1 illustrates an overview of an example system for multi-vehicle communication and control.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, multiple vehicles may be operated at a worksite, for example by multiple operators to complete a set of tasks. However, managing the logistical challenges associated with operating multiple vehicles and facilitating communication between the operators may be difficult, especially in instances where available communication technologies are limited. For example, the worksite may have inconsistent or nonexistent cellular network coverage, such that operators are unable to communicate reliably using cellular devices. These and other difficulties may complicate task completion, resulting in potential frustration, delays, added expense, and/or errors. With respect to logistics, manually monitoring and maintaining the fuel level and/or charge level of each vehicle may be challenging. In some instances, a vehicle may be outside of a radius in which it can be refueled and/or recharged, further complicating vehicle maintenance.

Accordingly, aspects of the present disclosure relate to multi-vehicle communication and control systems and methods. As an example, a hub vehicle may aggregate and disseminate information among multiple vehicles, manage vehicle configuration, and facilitate cross-vehicle communication between operators. Thus, a single hub vehicle may communicate with one or more remote vehicles, thereby acting as a centralized manager of the remote vehicles. Further, while examples herein are described in the context of a single hub vehicle, it will be appreciated that, in other examples, multiple such hub vehicles may be used, where the hub vehicles are in communication with one another and each hub vehicle is in further communication with a respective set of remote vehicles.

As used herein, a hub vehicle may be any of a variety of vehicles, including, but not limited to, a tow vehicle (e.g., configured to tow one or more remote vehicles or to tow a trailer capable of supporting such vehicles) or a truck (e.g., having a cargo area in which a remote vehicle may be stored). In other examples, the hub vehicle need not be capable of towing or carrying a remote vehicle, and may, in other instances, itself function as a remote vehicle. Further, while aspects of the present disclosure are described in the context of a hub vehicle, it will be appreciated that a hub need not be movable and may instead be at least temporarily immobile. Examples of such hubs include, but are not limited to, tower cranes and construction trailers.

As used herein, a remote vehicle is a vehicle in communication with a hub vehicle according to aspects of the present disclosure. Example remote vehicles include, but are not limited to, utility vehicles and recreational vehicles. For example, a utility vehicle may be a low-speed vehicle (e.g., a golf cart), a lawn mower, or a fleet vehicle. As another example, a recreational vehicle may be an all-terrain vehicle (ATV), a side-by-side (S×S) vehicle, an off-road vehicle, a two- or three-wheeled motorcycle, a snowmobile, watercraft, or a personal transport vehicle. Further, it will be appreciated that a fleet of vehicles comprising one or more remote vehicles and hub vehicles need not be homogenous. For example, a hub vehicle may be a vehicle that is better suited for road travel, while remote vehicles may each be specialized for various tasks at a worksite. Additionally, a remote vehicle may operate as a hub vehicle in some instances.

FIG. 1 illustrates an overview of an example system 100 for multi-vehicle communication and control. As illustrated, system 100 comprises hub vehicle 102, remote vehicle 104, extension vehicle 106, control device 108, and network 110. Hub vehicle 102, remote vehicle 104, extension vehicle 106, and control device 108 are illustrated as communicating via network 110, which may comprise a local area network, a wireless network, a cellular network, a satellite-based network, or the Internet, or any combination thereof, among other examples. For example, network 110 may comprise peer-to-peer communications between hub vehicle 102 and remote vehicle 104. Similarly, network 110 may comprise peer-to-peer communications between control device 108 and remote vehicle 104. As another example, extension vehicle 106 may act as a node of network 110, such that communications between hub vehicle 102 and remote vehicle 104 are relayed via extension vehicle 106.

Hub vehicle 102 is illustrated as comprising vehicle controller 112 and power system 126. Vehicle controller 112 comprises movement controller 118, communication controller 120, location controller 122, and fleet controller 124. In examples, movement controller 118 controls power system 126. For example, hub vehicle 102 may comprise one or more ground engaging members (not pictured), which are operatively coupled to power system 126 to power movement of hub vehicle 102. Power system 126 may comprise one or more power sources, such as a fuel tank, fuel cell, and/or one or more batteries. A prime mover of power system 126 may use an associated power source to power movement of hub vehicle 102 accordingly. Thus, hub vehicle 102 may be an internal combustion vehicle, a hybrid vehicle, or an electric vehicle, among other examples.

Vehicle controller 112 further comprises communication controller 120, which communicates with other vehicles and devices via network 110. In some instances, communication controller 120 may operate one or more wireless radios (e.g., a cellular radio, a Bluetooth radio, a Wi-Fi radio, and/or an ultra-wideband (UWB) radio) of hub vehicle 102. Similarly, communication controller 120 may operate one or more wired network connections (e.g., a controller area network (CAN) bus or a two-wire serial communication network) of hub vehicle 102. As an example, communication controller 120 may communicate wirelessly with remote vehicle 104 when remote vehicle 104 is operating remote from hub vehicle 102. As another example, communication controller 120 may utilize wired communication when remote vehicle 104 is in electrical communication with hub vehicle 102, as may be the case when remote vehicle 104 is towed or otherwise supported by hub vehicle 102 (e.g., positioned in a cargo area of hub vehicle 102 or loaded onto a trailer coupled to hub vehicle 102).

Location controller 122 may determine a geographic location of hub vehicle 102 (e.g., via a global positioning system (GPS) sensor or based on assisted GPS), as well as a relative position of hub vehicle 102 with respect to remote vehicle 104 and/or extension vehicle 106. In examples, location controller 122 manages geofences, which may be user-defined. For example, location controller 122 may store a geofence, edit a geofence, or update a geofence (e.g., according to a location of hub vehicle 102). In other examples, a geofence utilized by location controller 122 may be a relative geofence, whereby the geometry of the geofence is evaluated relative to a given location.

Vehicle controller 112 further comprises fleet controller 124, which manages remote vehicle 104 and extension vehicle 106 according to aspects described herein. While system 100 is illustrated as comprising one hub vehicle 102, one remote vehicle 104, and one extension vehicle 106, it will be appreciated that any number of such elements may be used in other examples. Further, while aspects are described with respect to fleet controller 124 of hub vehicle 102, it will be appreciated that, in other examples, a mobile computing device may implement such aspects. For example, an application of a mobile computing device may communicate with fleet controller 124 to control aspects of its operation or, as another example, a mobile computing device may communicate with a server computing device, which may communicate with fleet controller 124 via network 110. The mobile computing device may include, but is not limited to, a laptop, a tablet, a smart phone, or the like.

Fleet controller 124 may communicate with remote vehicle 104 (e.g., via communication controller 120) to provide an indication as to a geofence in which movement of remote vehicle 104 is restricted. In other examples, fleet controller 124 communicates vehicle configuration information, including, but not limited to, acceleration characteristics (e.g., a maximum, minimum, and/or average acceleration), speed characteristics (e.g., a maximum, minimum, and/or average speed), suspension characteristics, and/or a power source reserve level. In examples, hub vehicle 102 may receive user input via an instrument cluster that defines a geofence and/or such vehicle characteristics. In other examples, vehicle configuration may be rules-based, such that the vehicle configuration information is generated by a set of rules that specify various aspects of the vehicle configuration. Example rules may be associated with a worksite or based on an experience and/or operator clearance level.

Fleet controller 124 may receive state information associated with remote vehicle 104 and/or extension vehicle 106. Example vehicle state information includes, but is not limited to, a location (e.g., as GPS coordinates or as a distance and bearing), a speed, a direction of travel, a power source state (e.g., as a percentage or as a quantity, such as an indication that a fuel tank contains x remaining gallons of fuel or that a battery is y percent full), and/or an operational state (e.g., that the vehicle powered on or powered off, or whether the vehicle is towing a trailer and/or is loaded with cargo).

Received state information may be processed by fleet controller 124 to generate a display comprising the relative or absolute location of vehicles 104 and/or 106, thereby enabling an operator of hub vehicle 102 to view their respective locations with respect to hub vehicle 102. In some instances, actuating a representation (e.g., an icon or a picture) associated with a displayed vehicle may cause additional information to be displayed. For example, a vehicle configuration and/or geofence associated with the vehicle may be presented. As another example, an indication as to the power source state of the vehicle may be presented. For example, remaining energy may be presented and may be color-coded. As another example, an estimated region of travel based on the remaining energy may be presented. As a further example, a power source state of remote vehicle 104 may be presented when remote vehicle 104 is towed or otherwise supported by hub vehicle 102 (e.g., positioned in a cargo area of hub vehicle 102 or loaded onto a trailer coupled to hub vehicle 102).

In examples, fleet controller 124 facilitates communication among remote vehicles. For example, fleet controller 124 may receive a communication from remote vehicle 104, which it may present to an operator of hub vehicle 102 and/or relay to one or more other remote vehicles. As another example, fleet controller 124 may receive a communication from an operator of hub vehicle 102, which may be transmitted to remote vehicle 104 and/or other remote vehicles. Thus, communications may be broadcast or may be directed to one or more vehicles. Example communications include, but are not limited to, text communications, audio communications, and/or video communications. It will be appreciated that a communication may be a stream in some examples. Further, messages need not be relayed using the same communication technology with which they were received. For example, hub vehicle 102 may receive a communication via an Internet connection and may relay the communication to remote vehicle 104 via a peer-to-peer wireless connection.

Fleet controller 124 may provide task management functionality. For example, fleet controller 124 may manage a shared task list, which may be associated with a worksite and/or a set of vehicles. As an example, a shared task list may be synchronized with remote vehicle 104, thereby enabling both an operator of hub vehicle 102 and an operator of remote vehicle 104 to view the task list and statuses of tasks listed therein. In other examples, fleet controller 124 may receive user input of an assignment of a task to remote vehicle 104, such that an indication of the assignment may be provided to remote vehicle 104 and presented to an operator accordingly. Similarly, an indication of an updated task status may be received from remote vehicle 104, which may be processed by fleet controller 124 to update the task in the task list accordingly. As a further example, tasks may be modified, added, deleted, and/or reassigned, such that the task list is synchronized among vehicles accordingly.

Fleet controller 124 may provide an indication to remote vehicle 104 to travel to a specific location, such as a location of hub vehicle 102 (e.g., as may be determined by location controller 122). Accordingly, remote vehicle 104 may present an indication to an operator and, in some examples, may present a route and/or navigation directions for remote vehicle 104 to travel to the location. In other examples, remote vehicle 104 may automatically travel to the indicated location in response to the indication. It will be appreciated that a similar indication may be received from remote vehicle 104 by hub vehicle 102, such that an operator of hub vehicle 102 may be similarly presented with an indication, route, and/or navigation directions or, as another example, such that hub vehicle 102 may automatically travel to the indicated location.

System 100 is further illustrated as comprising extension vehicle 106. Similar to hub vehicle 102 and remote vehicle 104, extension vehicle 106 may be any of a variety of vehicles. In examples, extension vehicle 106 may be an autonomous vehicle, such as an autonomous land vehicle or an autonomous aerial vehicle. Extension vehicle 106 is illustrated as comprising vehicle controller 116, which may implement similar functionality as described above with respect to vehicle controller 112 of hub vehicle 102. In examples, extension vehicle 106 operates to extend the range of hub vehicle 102. For example, wireless communication technologies implemented by hub vehicle 102 may have limited range. Accordingly, extension vehicle 106 may act as a relay between hub vehicle 102 and remote vehicle 104, such that the distance between hub vehicle 102 and remote vehicle 104 is greater than would otherwise be possible. Similarly, extension vehicle 106 may be used in the event of obstacles and/or terrain that affect the capabilities of hub vehicle 102.

Remote vehicle 104 comprises vehicle controller 114 and power system 134, aspects of which may be similar to those of hub vehicle 102 and extension vehicle 106 and are therefore not necessarily re-described below in detail. As discussed above, fleet controller 140 may receive an indication of a geofence and/or vehicle configuration information from fleet controller 124 of hub vehicle 102. As a result, fleet controller 140 may communicate with movement controller 128 and/or location controller 132 to configure aspects of remote vehicle 104 according to the received indications. For example, fleet controller 140 may provide an indication of a received geofence to location controller 132, such that location controller 132 evaluates a location of remote vehicle 104 with respect to the geofence and communicates with movement controller 128 to restrict movement of remote vehicle 104 accordingly. As noted above, a geofence may be relative, for example with respect to a location of hub vehicle 102 and/or extension vehicle 106, such that location updates of an associated vehicle may be received by fleet controller 140 and used to adhere to the relative geofence accordingly.

In some examples, fleet controller 140 may evaluate a power source state of remote vehicle 104, for example according to a power source reserve level (e.g., as may be specified by fleet controller 124) and/or an energy estimate for travel between remote vehicle 104 and hub vehicle 102. In examples, fleet controller 140 may determine that the power source state of remote vehicle 104 restricts movement of remote vehicle 104, thereby preventing remote vehicle 104 from traveling to a location where remote vehicle 104 would be unable to return to hub vehicle 102. Such a restriction may be more limiting than a geofence specified by fleet controller 124 in some examples. In other instances, the evaluation may instead be performed with respect to extension vehicle 106, as may be the case when extension vehicle 106 comprises a means to replenish a power source of remote vehicle 104. In examples, fleet controller 140 may present a route and/or navigation directions for traveling from a current location of remote vehicle 104 to hub vehicle 102 and/or extension vehicle 106.

As noted above, vehicle state information may be provided by fleet controller 140 to hub vehicle 102. For example, fleet controller 140 may provide vehicle state information according to a predetermined time interval, in response to one or more events (e.g., a change in operation state, exceeding a predetermined distance from hub vehicle 102, or attempting to exit a specified geofence), and/or in response to a change of vehicle state. Further, movement controller 128 may cause vehicle 104 to move automatically according to aspects described herein. For example, movement controller 128 may process sensor input, for example from one or more cameras, LIDAR, radar, or ultrasonic sensors. Accordingly, movement controller 128 may cause remote vehicle 104 to automatically return to hub vehicle 102, for example to maneuver into a cargo area or a trailer. In such instances, remote vehicle 104 may automatically establish an electrical connection with hub vehicle 102, for example thereby enabling communication controller 120 and communication controller 130 to communicate using a wired connection.

System 100 is further illustrated as comprising control device 108, which includes communication controller 136 and vehicle configuration store 138. Control device 108 may be any of a variety of devices, including a key fob and a mobile computing device. Aspects of communication controller 136 may be similar to those discussed above with respect to communication controllers 120 and 130, and are therefore not re-described in detail. In examples, control device 108 receives vehicle configuration information from hub vehicle 102, which may be stored by vehicle configuration store 138. Additionally, control device 108 may be configured to enable an operator to gain access to hub vehicle 102 and/or remote vehicle 104. For example, control device 108 may be used to unlock, power on, and/or maneuver hub vehicle 102 and/or remote vehicle 104. In such instances, vehicle configuration information of vehicle configuration store 138 may be provided to the vehicle, thereby configuring the vehicle according to the vehicle configuration information. As a result, an operator may be able to use control device 108 for multiple vehicles (e.g., hub vehicle 102 and remote vehicle 104) and the associated vehicle configuration may be consistent across vehicles. It will be appreciated that operation of a vehicle need not be exclusive to a single control device.

Figure 2B:
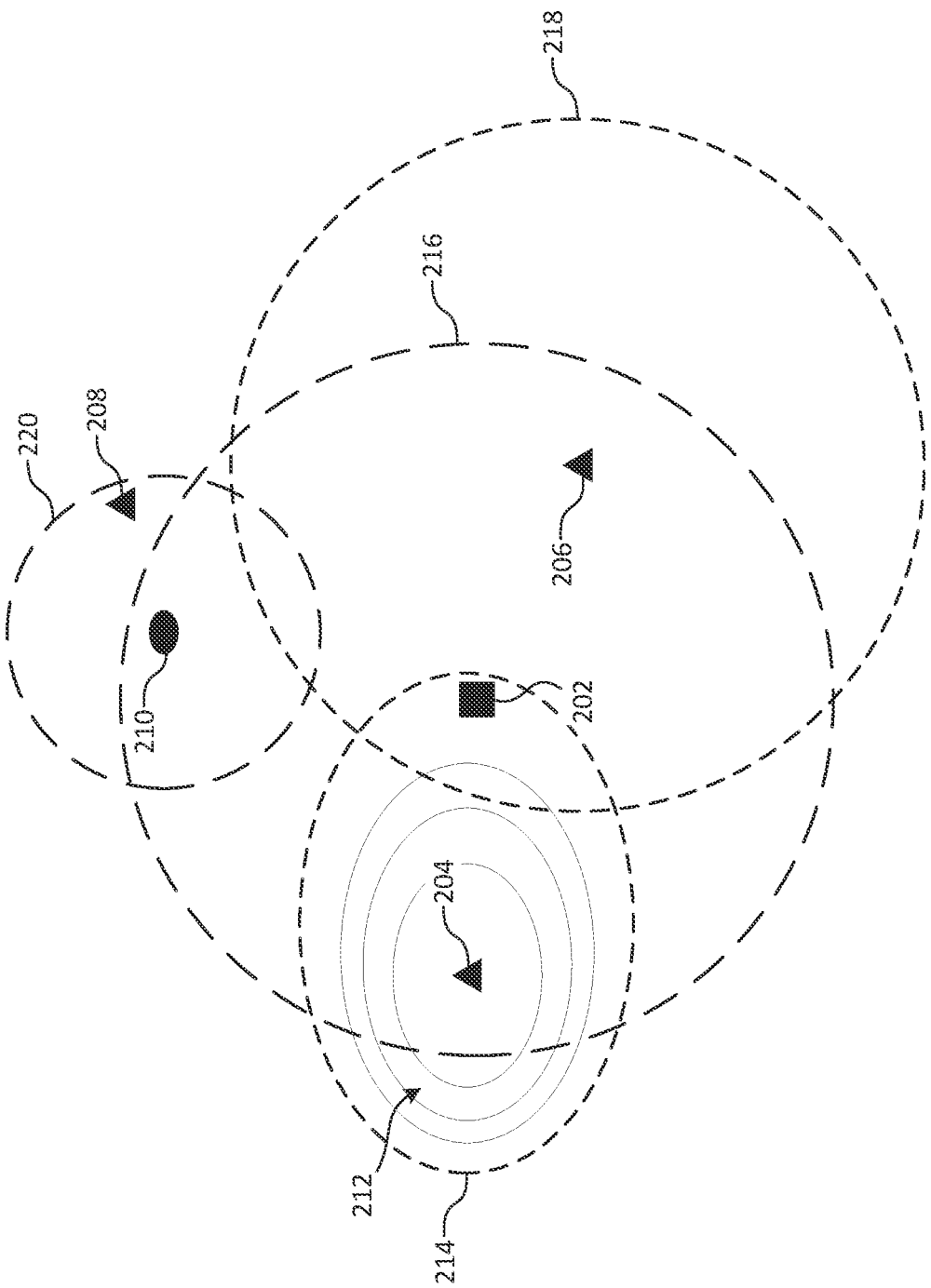

FIGS. 2A-2B illustrate conceptual diagrams of a worksite in which aspects of the present disclosure may be practiced. As illustrated, FIGS. 2A-2B comprise hub vehicle 202, remote vehicles 204, 206, and 208, and extension vehicle 210. Aspects of vehicles 202, 204, 206, 208, and 210 are similar to those discussed above with respect to hub vehicle 102, remote vehicle 104, and extension vehicle 106 and are therefore not re-described in detail below. While aspects of the present disclosure are discussed in the context of a worksite, it will be appreciated that the described techniques are applicable to any of a variety of other contexts. For example, the same operator may operate both a hub vehicle and a remote vehicle, as may be the case when the operator navigates to a remote area. The operator may leave the hub vehicle near a road and operate a remote vehicle to maneuver terrain that would be difficult or otherwise impossible to traverse using the hub vehicle.

With respect to FIG. 2A, geofence 216 is defined with respect to hub vehicle 202. In examples, an indication of geofence 216 is provided to vehicles 204, 206, 208, and 210, such that each respective fleet controller may restrict movement of the vehicle accordingly. As discussed above, geofence 216 may be relative to hub vehicle 202, such that geofence 216 moves as the location of hub vehicle 202 changes. However, as illustrated, remote vehicle 208 is outside geofence 216. In some instances, a secondary geofence 220 may be defined with respect to extension vehicle 210, such that remote vehicle 208 may operate within secondary geofence 220 and extension vehicle 210 operates within geofence 216.

As illustrated, both remote vehicle 204 and remote vehicle 206 are operating within geofence 216. Further, remote vehicle 204 is illustrated as operating on terrain 212, such that the energy required to maneuver about terrain 212 may differ from that of remote vehicles 206 and/or 208, which are illustrated as operating on less demanding terrain.

Accordingly, FIG. 2B illustrates energy estimate 214 for remote vehicle 204 and energy estimate 218 for remote vehicle 206. Energy estimates 214 and 218 may be generated by a vehicle controller based at least in part on a power source state for an associated vehicle, the location of the vehicle, and/or geographical data (e.g., terrain data and/or route data). As another example, an energy estimate may be based at least in part on a power source reserve level, such that the range of the vehicle is determined to enable the vehicle to travel to the hub and retain the reserve level upon arrival at the hub.

For example, remote vehicle 204 may generate energy estimate 214 or, as another example, hub vehicle 202 may generate energy estimate 218. As illustrated, energy estimate 218 is larger than that of energy estimate 214, for example by virtue of remote vehicle 206 operating on less demanding terrain than remote vehicle 204. In other instances, associated power source states for remote vehicles 204 and 206 may differ. Further, energy estimate 214 is illustrated as having a different shape than energy estimate 218, as travel in different directions (e.g., maneuvering terrain 212) may not have uniform energy expenditures associated therewith.

As illustrated, energy estimate 214 is more limiting than geofence 216. Accordingly, a fleet controller of remote vehicle 204 may restrict movement of remote vehicle 204 to ensure that hub vehicle 202 remains within energy estimate 214 while also remaining within geofence 216. By contrast, energy estimate 218 does not restrict movement of remote vehicle 206, though the area associated with energy estimate 218 will change as the power source state of remote vehicle 206 changes.

While geofences 216 and 220, as well as energy estimates 214 and 218 are illustrated as having circular or oval shapes, it will be appreciated that geofences and energy estimates may have any of a variety of shapes. Further, an energy estimate of remote vehicle 208 may be evaluated with respect to the location of extension vehicle 210 and/or hub vehicle 202 according to aspects described herein. A display of vehicles presented by a vehicle controller may comprise similar aspects to those depicted with respect to FIGS. 2A-2B, such that user actuation of an icon associated with one of vehicles 202, 204, 206, 208, and 210 may cause information associated with the vehicle to be displayed as discussed above.

Figure 3A:
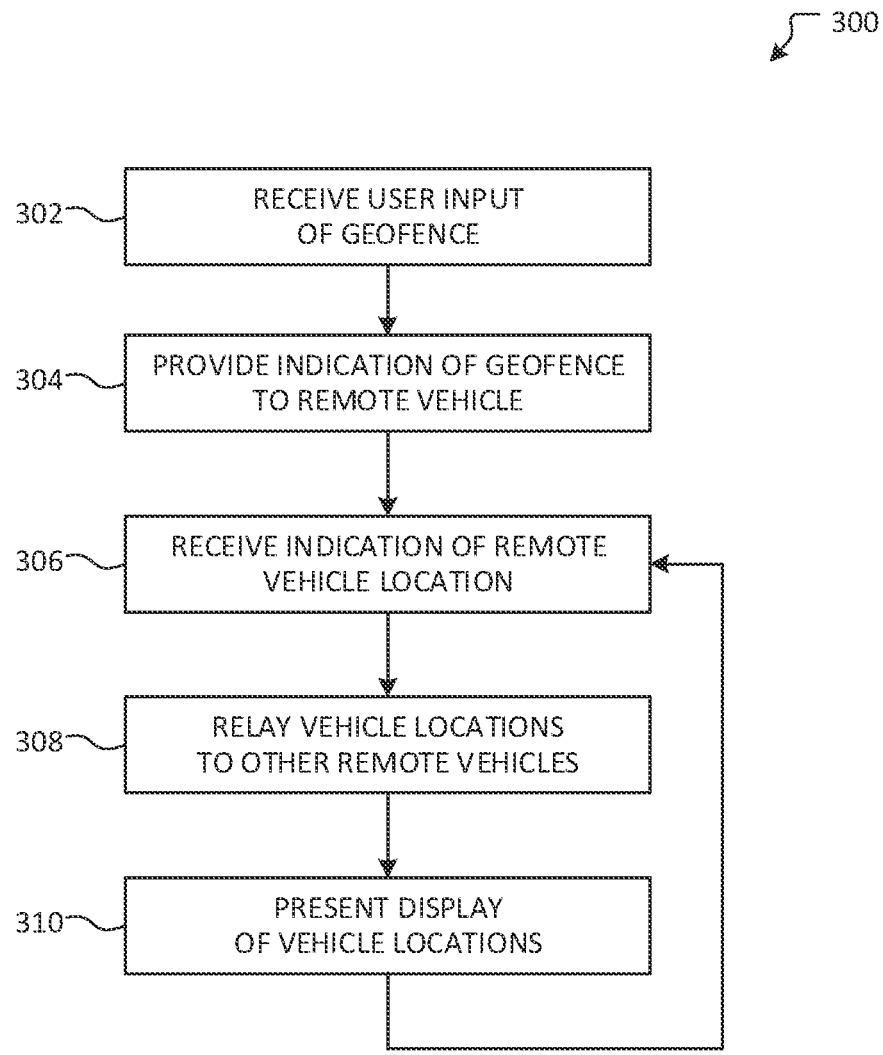
FIG. 3A illustrates an overview of an example method for controlling operation of a remote vehicle according to aspects of the present disclosure.

FIG. 3A illustrates an overview of an example method 300 for controlling operation of a remote vehicle according to aspects of the present disclosure. In examples, aspects of method 300 may be performed by a vehicle controller, such as vehicle controller 112, 114, or 116 discussed above with respect to hub vehicle 102, remote vehicle 104, and extension vehicle 106, respectively, in FIG. 1.

Method 300 begins at operation 302, where user input comprising a geofence is received. For example, a user may indicate a location and an associated range, such as a fixed location or a vehicle around which the geofence should be maintained. In other examples, a geofence need not be a radius but may instead be any of a variety of shapes. For example, touch screen user input may be received indicating a region drawn on a map displayed by the touch screen.

At operation 304, an indication of the geofence is provided to one or more remote vehicles. In instances where the geofence is relative to a vehicle, the indication may further comprise a location of the vehicle with which the geofence is associated. For example, a location of a hub vehicle may be provided (e.g., as may be determined by a location controller), or in instances where a geofence is relative to a remote vehicle or an extension vehicle, a location may be received from the vehicle and relayed accordingly.

Flow progresses to operation 306, where an indication of a remote vehicle location is received. In examples, the location is received as part of vehicle state information as described above. Accordingly, at operation 308, vehicle locations are relayed to other vehicles, thereby enabling vehicles of the fleet to generate a map indicating the location of other vehicles in the fleet. Additionally, operation 308 may comprise an updated location for a vehicle associated with the geofence that was provided at operation 304. In some instances, not all locations are relayed. For example, a location of an extension vehicle may be received at operation 306 but may not be relayed at operation 308, such that the location may only be presented to an operator of the hub vehicle.

At operation 310, a display is presented of vehicle locations based on the indications received at operation 306. FIGS. 2A-2B illustrate example displays that may be generated based on vehicle locations received from vehicles of a fleet according to aspects described herein. In other examples, a vehicle may not comprise a display such that operation 310 may be omitted. Method 300 ends at operation 310.

Figure 3B:
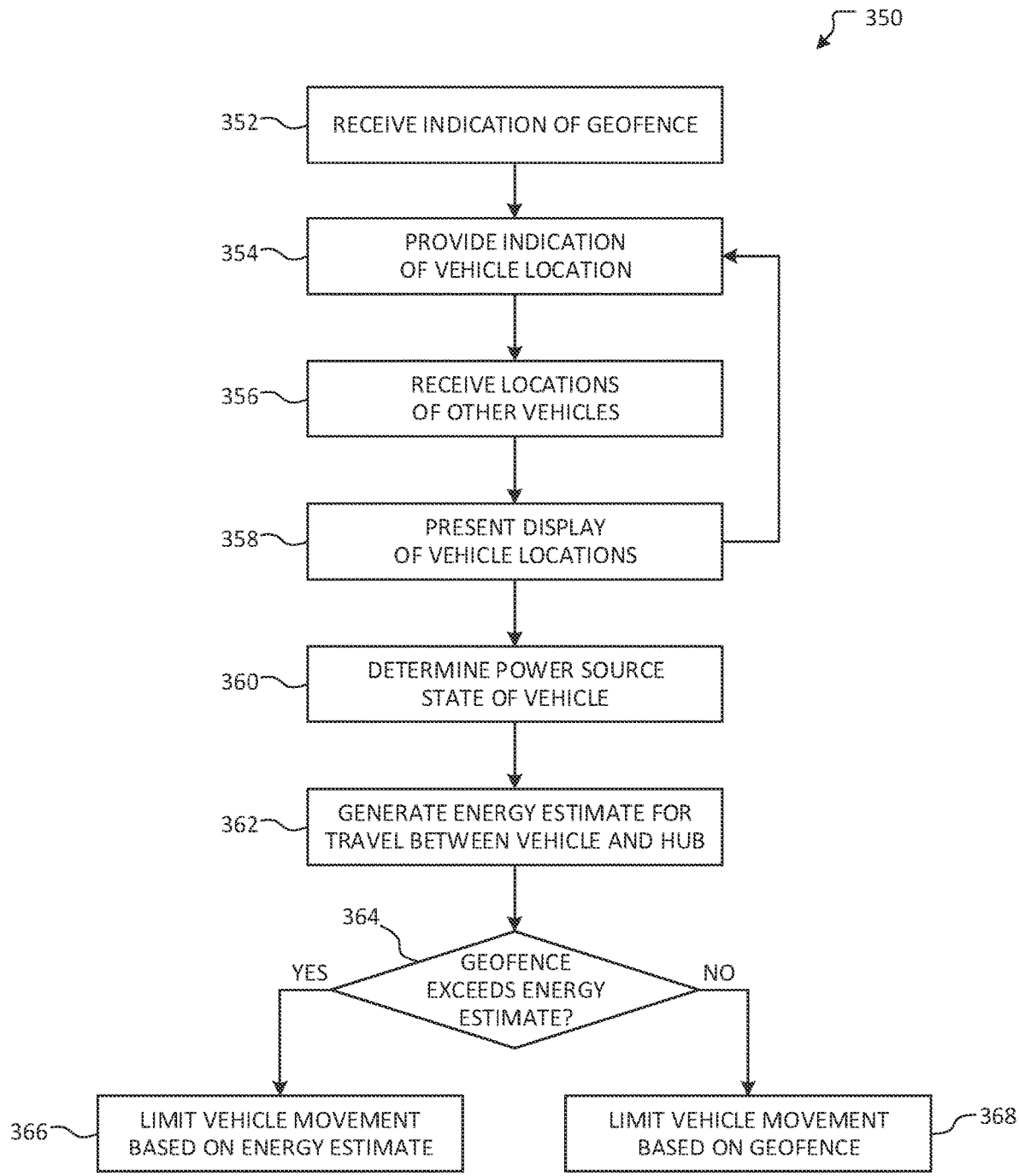
FIG. 3B illustrates an overview of an example method for communicating with a hub vehicle according to aspects of the present disclosure.

FIG. 3B illustrates an overview of an example method 350 for communicating with a hub vehicle according to aspects of the present disclosure. In examples, aspects of method 350 are performed by a remote vehicle, such as remote vehicle 104 in FIG. 1 or remote vehicles 204, 206, or 208 in FIG. 2.

Method 350 begins at operation 352, where an indication of a geofence is received. As discussed above, in instances where the geofence is relative to a vehicle, the indication may further comprise a location of the vehicle with which the geofence is associated (e.g., geofence 216 of hub vehicle 202 in FIG. 2). At operation 354, an indication of the vehicle (e.g. hub vehicle 202) location is provided. For example, the location may be determined by a location controller of the vehicle.

Flow progresses to operation 356, where locations of other vehicles are received. For example, the location of a hub vehicle and/or one or more remote vehicles and extension vehicles may be received. In examples, the locations are received as a result of other vehicles performing aspects of operation 354 and a hub vehicle performing aspects of operations 306 and 308 discussed above with respect to FIG. 3A.

At operation 358, a display of vehicle locations is presented. For example, the display may be presented via an instrument cluster of the vehicle. In some instances, operation 356 may comprise receiving any of a variety of other vehicle state information, such that at least a part of the received vehicle state information may be presented in association with a vehicle in response to user actuation of a vehicle presented by the display. In other examples, a vehicle may not include a display such that operation 358 may be omitted. FIGS. 2A-2B illustrate example displays that may be generated based on vehicle locations according to aspects described herein. An arrow is illustrated from operation 358 to operation 354 to indicate that flow may loop between operations 354, 356, and 358 to enable synchronization of vehicle locations (and other state information) among vehicles of the fleet according to aspects of the present disclosure.

At operation 360, a power source state is determined for the vehicle. In some instances, multiple power sources may be evaluated at operation 360 to generate an overall power source state for the vehicle. For example, the vehicle may be a hybrid vehicle having both a fuel power source and a battery power source or, as another example, the vehicle may have multiple fuel and/or battery power sources. The power source state may comprise a fuel level, a charge level, and/or an estimated amount of travel distance or time based on current or expected usage. It will be appreciated that a power source state may comprise any of a variety of additional or alternative information and may be generated according to any of a variety of other techniques.

Flow progresses to operation 362, where an energy estimate is generated for travel between the vehicle and a hub vehicle. For example, a location of the hub vehicle received at operation 356 may be processed in relation to a location of the vehicle determined by a location controller. As noted above, the estimate may be generated using geographical data (e.g., terrain data and/or route data) associated with the location of the vehicle and/or the location of the hub. In some instances, operation 362 additionally or alternatively comprises evaluating a location of an extension vehicle, as may be the case in examples where an extension vehicle includes a means to replenish the power source state of the vehicle.

At determination 364, it is determined whether the geofence received at operation 352 exceeds the energy estimate generated at operation 362. For example, in instances where the geofence is more permissive than the energy estimate associated with traveling to the hub vehicle (or, in other examples, the extension vehicle), the vehicle may inadvertently deplete its power source before it is able to return to the hub vehicle.

Accordingly, if it is determined that the geofence exceeds the energy estimate, flow branches "YES" to operation 366, where vehicle movement is limited based on the energy estimate that was generated at operation 362. For example, an indication may be provided to a location controller to ensure that the vehicle location does not travel to a location at which the distance between the vehicle and the hub exceeds the energy estimate. Accordingly, the location controller may communicate with a movement controller to restrict movement of the vehicle accordingly. Flow terminates at operation 366.

However, if it is determined that the geofence does not exceed the energy estimate, flow instead branches "NO" to operation 368, where vehicle movement is limited based on the geofence that was received at operation 352. For example, an indication may be provided to a location controller to ensure that the vehicle location does not travel outside of the geofence. Accordingly, the location controller may communicate with a movement controller to restrict movement of the vehicle accordingly. In some instances, an updated location for a vehicle associated with the geofence may be received as a result of performing operation 356 discussed above, such that the resulting restriction is updated accordingly. Flow terminates at operation 368.

Figure 4:
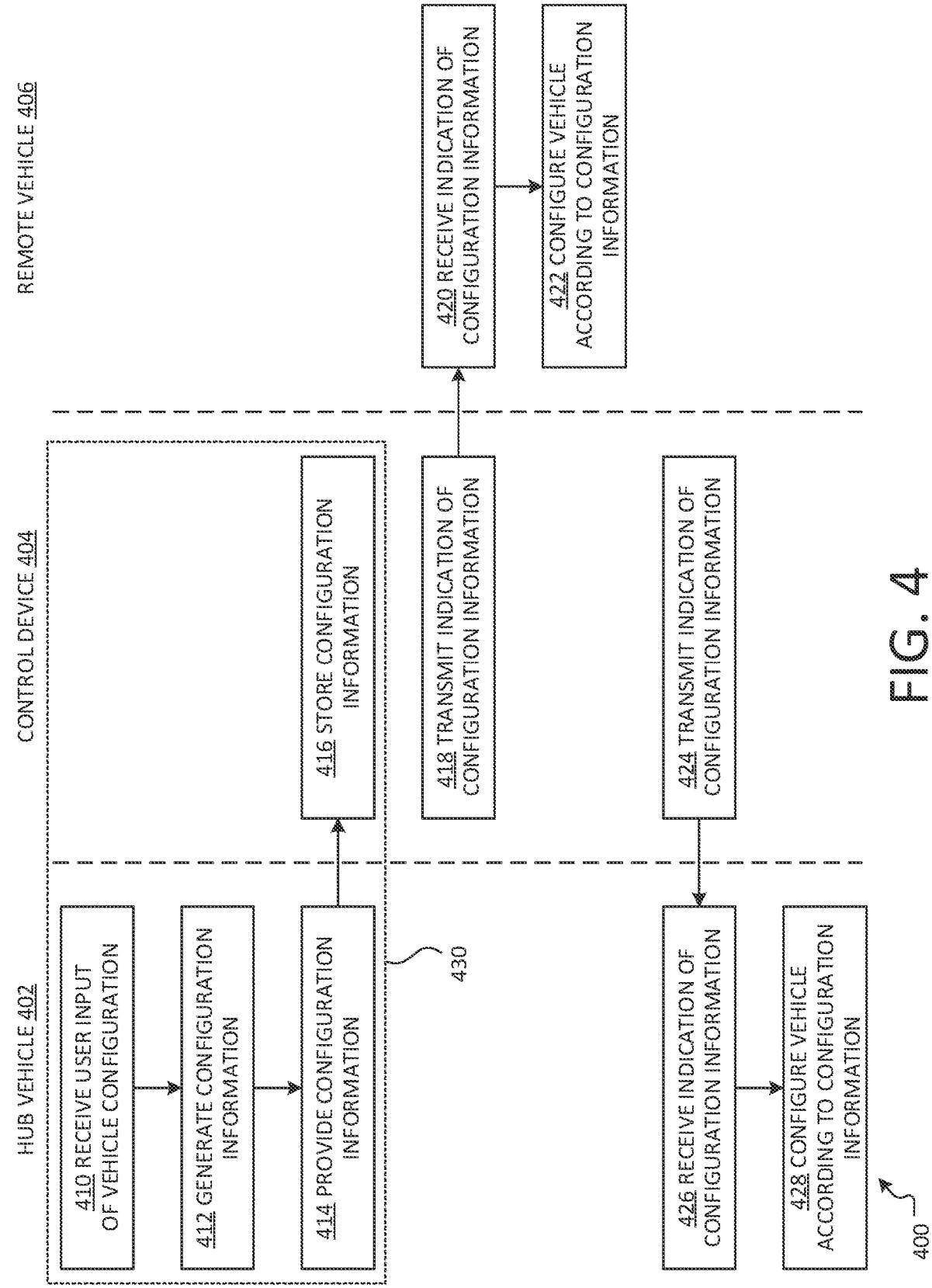
FIG. 4 illustrates an overview of an example process flow for vehicle configuration according to aspects of the present disclosure.

FIG. 4 illustrates an overview of an example process flow 400 for vehicle configuration according to aspects of the present disclosure. As illustrated, process flow 400 occurs between hub vehicle 402, control device 404, and remote vehicle 406. Aspects of hub vehicle 402, control device 404, and remote vehicle 406 may be similar to hub vehicle 102, control device 108, and remote vehicle 104 discussed above with respect to FIG. 1 and are therefore not necessarily re-described below in detail.

Flow 400 begins at operation 410, where user input indicating vehicle configuration is received. For example, the indication may comprise an indication of a geofence, acceleration characteristics, speed characteristics, suspension characteristics, and/or a power source reserve level. As described above, the user input may be received via an instrument cluster of hub vehicle 402 or, as another example, a mobile computing device may be used to provide the user input. Thus, it will be appreciated that any of a variety of input devices and associated input techniques may be used.

Accordingly, at operation 412, vehicle configuration information is generated based on the received user input and the generated configuration information is provided to control device 404 at operation 414. Control device 404 stores the vehicle configuration information at operation 416. For example, the vehicle configuration information may be stored in a vehicle configuration store, such as vehicle configuration store 138 of control device 108 discussed above with respect to FIG. 1. Operations 410-416 are illustrated within a dashed box to indicate that, in other examples, any of a variety of other techniques may be used to configure a control device having vehicle configuration information. For example, control device 404 may be a mobile computing device, such that an application may be used to generate the configuration information on the mobile computing device itself.

At operation 418, an indication of the configuration information is transmitted to remote vehicle 406. For example, the indication may be transmitted by a communication controller of control device 404 to a communication controller of remote vehicle 406. As a result, remote vehicle 406 receives the indication at operation 420 and, at operation 422, configures the vehicle according to the configuration information. For example, a fleet controller of remote vehicle 406 may process the configuration information and communicate with any of a variety of other controllers of remote vehicle 406.

Similarly, at operation 424, an indication of the configuration information is transmitted to hub vehicle 402. For example, the indication may be transmitted by a communication controller of control device 404 to a communication controller of hub vehicle 402. As a result, hub vehicle 402 receives the indication at operation 426 and, at operation 428, configures the vehicle according to the configuration information. For example, a fleet controller of hub vehicle 402 may process the configuration information and communicate with any of a variety of other controllers of remote vehicle 402. Thus, as illustrated by process flow 400, control device 404 may be configured to operate with any number of vehicles.

Figure 5:
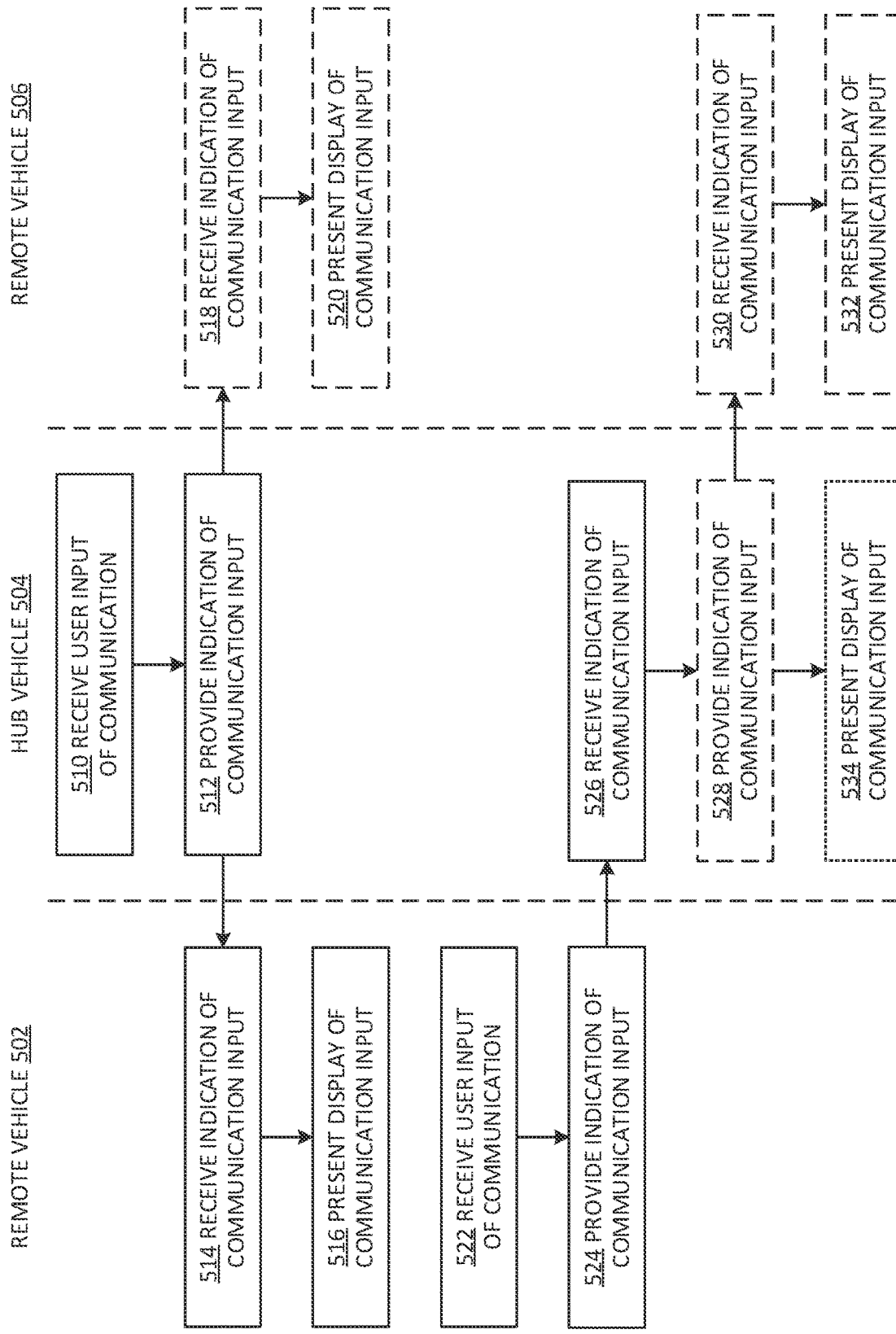
FIG. 5 illustrates an overview of an example process flow for multi-vehicle communication according to aspects of the present disclosure.

FIG. 5 illustrates an overview of an example process flow 500 for multi-vehicle communication according to aspects of the present disclosure. As illustrated, process flow 500 occurs between remote vehicle 502, hub vehicle 504, and remote vehicle 506. Aspects of remote vehicle 502, hub vehicle 504, and remote vehicle 506 may be similar to hub vehicle 102, and remote vehicle 104 discussed above with respect to FIG. 1 and are therefore not re-described below in detail.

Flow 500 begins at operation 510, where a user input comprising a communication is received. Example communications include, but are not limited to, text communications, audio communications, and/or video communications. As described above, the user input may be received via an instrument cluster of hub vehicle 504 or, as another example, a mobile computing device may be used to provide the user input. Thus, it will be appreciated that any of a variety of input devices and associated input techniques may be used.

At operation 512, an indication of the communication input is provided to remote vehicle 502 and remote vehicle 506. Accordingly, remote vehicle 502 receives the indication at operation 514 and provides a display associated with the communication input. For example, the display may be presented via an instrument cluster of the vehicle or operation 516 may comprise causing a mobile computing device to present a display associated with the communication input. The display may comprise an indication that the communication input has been received and/or content of the communication input. In instances where the communication input comprises other types of input (e.g., other than a text communication), it will be appreciated that operation 516 may comprise playing an audio communication or a video communication. Further, operations 510-516 may be performed iteratively so as to provide a stream of audio and/or video communication from hub vehicle 504 to an operator of remote vehicle 502.

Similarly, remote vehicle 506 receives the indication at operation 518 and provides a display associated with the communication input. For example, the display may be presented via an instrument cluster of the vehicle or operation 518 may comprise causing a mobile computing device to present a display associated with the communication input. The display may comprise an indication that the communication input has been received and/or content of the communication input. In instances where the communication input comprises other types of input (e.g., other than a text communication), it will be appreciated that operation 518 may comprise playing an audio communication or a video communication. Further, operations 510, 512, 518, and 520 may be performed iteratively to provide a stream of audio and/or video communication from hub vehicle 504 to an operator of remote vehicle 505.

Operations 518 and 520 are illustrated using a dashed box to indicate that, in other examples, operations 518 and 520 may be omitted. As discussed above, communications may be broadcast or provided to a plurality of vehicles (e.g., such that operation 512 comprises providing an indication to both remote vehicles 502 and 506) or may be targeted to a specific vehicle (e.g., such that operation 512 comprises providing the indication to remote vehicle 502 but not remote vehicle 506).

At operation 522, user input of a communication is received by remote vehicle 502. Similar to the user communication discussed above with respect to operation 510, the user input may be received via an instrument cluster of remote vehicle 502 or a mobile computing device, among other examples. Accordingly, remote vehicle 502 provides an indication of the communication input to hub vehicle 504 at operation 524, which is received by hub vehicle 504 at operation 526.

In some instances, hub vehicle 504 relays the communication to remote vehicle 506 at operation 528, such that the communication is received by remote vehicle 506 at operation 530 and presented to an operator of remote vehicle 506 at operation 532, which may be similar to operations 514, 516, 518, and 520 discussed above. Thus, an operator of remote vehicle 502 may communicate with an operator of remote vehicle 506 via hub vehicle 504.

In another example, hub vehicle 504 presents a display of the communication input at operation 534, such that the operator of remote vehicle 502 may communicate with an operator of hub vehicle 504. Accordingly, operations 526-534 may be performed in instances where an operator of remote vehicle 502 is communicating with operators of hub vehicle 504 and remote vehicle 506, while operations 528-532 may be omitted in instances where the communication is only to the operator of hub vehicle 504. Similarly, operations 528-532 may be retained and operation 534 may be omitted, as may be the case when the operator of remote vehicle 502 is communicating with the operator of remote vehicle 506 but not the operator of hub vehicle 504.

It will be appreciated that flow 500 is provided as an example of communications among a set of three vehicles 502-506 and that similar techniques may be applied to any number of vehicles. For example, operation 528 may comprise providing an indication of the communication to any number of vehicles, as may be specified by an operator of remote vehicle 502 as part of the user input received at operation 522. Further, similar techniques may be applied to other information that is transmitted within a fleet of vehicles, such as a shared task list and task updates associated therewith. Flow 500 terminates at operation 532 in some examples or, in other examples, flow 500 may terminate at operation 534.

Figure 6:
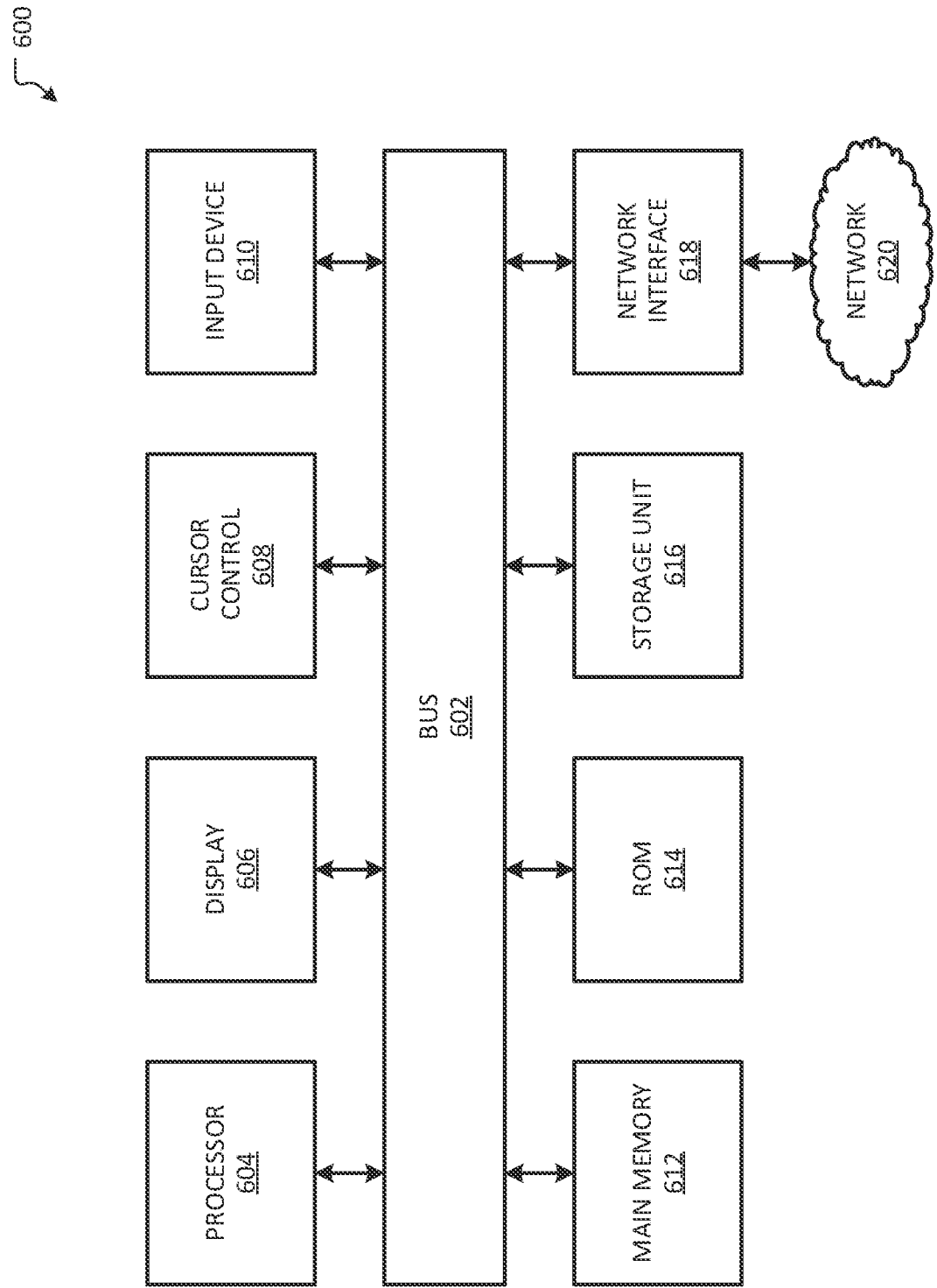
FIG. 6 illustrates a diagram of a computing system for multi-vehicle communication and control.

FIG. 6 illustrates a diagram of a computing system 600 for multi-vehicle communication and control. For example, some or all of the functions of control device 108 and vehicle controllers 112, 114, and 116 may be performed by a computing system that has similar components as the computing system 600. This diagram is merely an example, which should not unduly limit the scope of the claims. One of ordinary skill in the art would recognize many variations, alternatives, and modifications.

The computing system 600 includes a bus 602 or other communication mechanism for communicating information between, a processor 604, a display 606, a cursor control component 608, an input device 610, a main memory 612, a read only memory (ROM) 614, a storage unit 616, and/or a network interface 618. In some examples, the bus 602 is coupled to the processor 604, the display 606, the cursor control component 608, the input device 610, the main memory 612, the read only memory (ROM) 614, the storage unit 616, and/or the network interface 618. And, in certain examples, the network interface 618 is coupled to a network 620 (e.g., the network 110).

In some examples, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For example, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

Thus, computing system 600 may include at least some form of computer readable media. The computer readable media may be any available media that can be accessed by processor 604 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

In embodiments, an electronic key is associated with hub vehicle 102 and at least one remote vehicle 104. The electronic key is configured to both provide an indication to hub vehicle 102 to permit one or more operations of hub vehicle 102, such as starting of hub vehicle 102 and placing hub vehicle 102 in a drive configuration to move relative to a ground surface, and to permit one or operations of remote vehicle 104, such as starting of remote vehicle 104 and placing remote vehicle 104 in a drive configuration to move relative to a ground surface. An advantage, among others, of having a common electronic key for hub vehicle 102 and remote vehicle 104 is the number of keys to be carried by an operator may be reduced. The electronic key may be a key fob, a personal mobile device such as a smartphone, a physical key with electrical contacts, and other suitable devices. In embodiments, the electronic key includes one or more user profiles which are communicated to one or both of hub vehicle 102 and remote vehicle 104 to control the operation of a vehicle system, limit a speed of the vehicle, alter a position of one or more devices, such as seats, steering wheel, mirrors, and other devices, and/or to configure one or more vehicle settings. In embodiments, the electronic key is activated with a passcode or other suitable personalized input.

In embodiments, the location information of one or more of hub vehicle 102 and a remote vehicle 104 may be used in conjunction with map information to determine potential intersection points. For example, a hub vehicle 102 may have access to a road map information database and a remote vehicle 104 may have access to a trail map information database or a topographical information database. The one or more databases may be stored locally at the respective vehicles or stored remotely and accessed over a wireless network. Further, in embodiments, one or both of hub vehicle 102 and remote vehicle 104 includes access to at least two of a road map database, a trail map database, and a topographical information database. Based on the one or more databases, one of the hub vehicle 102 and remote vehicle 104 determines a suitable intersection between the future locations available to each of hub vehicle 102 and remote vehicle 104 and communicates to the other of hub vehicle 102 and remote vehicle 104 the intersection point and requests movement to the intersection location. In examples, the suitable location is selected to minimize a distance to be travelled by one or both of hub vehicle 102 and remote vehicle 104.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The following clauses illustrate example subject matter described herein.

Clause 1. A method for controlling operation of a remote vehicle, comprising: receiving, from a hub vehicle, an indication of a location of the hub vehicle; generating an energy estimate for a power source of the remote vehicle based on the location of the hub vehicle and a location of the remote vehicle; and restricting movement of the remote vehicle based on the energy estimate.

Clause 2. The method of clause 1, further comprising: receiving, from the hub vehicle, an indication of a geofence; and determining that the energy estimate is more limiting than the geofence; and based on determining that the energy estimate is more limiting to movement of the remote vehicle than the geofence, restricting movement of the remote vehicle based on to the energy estimate.

Clause 3. The method of clause 2, wherein the geofence is a relative geofence that is relative to the location of the hub vehicle.

Clause 4. The method of clause 1, wherein the energy estimate is generated based on at least one of terrain data or route data associated with the location of the remote vehicle.

Clause 5. The method of clause 1, wherein the power source is a first power source and the energy estimate is generated based on the first power source and a second power source of the remote vehicle.

Clause 6. A method for configuring operation of a plurality of vehicles by a control device, comprising: obtaining, by the control device, vehicle configuration information comprising a vehicle configuration; storing the vehicle configuration information in a vehicle configuration store of the control device; providing, to a first vehicle of the plurality of vehicles, an indication of the vehicle configuration information; and providing, to a second vehicle of the plurality of vehicles, an indication of the vehicle configuration information.

Clause 7. The method of clause 6, wherein obtaining the vehicle configuration information comprises receiving user input indicating the vehicle configuration.

Clause 8. The method of clause 6, wherein obtaining the vehicle configuration information comprises receiving, from the first vehicle of the plurality of vehicles, the vehicle configuration information.

Clause 9. The method of clause 6, wherein obtaining the vehicle configuration information comprises generating the vehicle configuration according to a set of rules, and wherein a rule of the set of rules associates the vehicle configuration and an operator clearance level.

Clause 10. The method of clause 6, wherein the vehicle configuration comprises at least one of a geofence, an acceleration characteristic, a speed characteristic, a suspension characteristic, or a power source reserve level.

Clause 11. A method for providing task management functionality for a set of vehicles, comprising: receiving, at a hub vehicle, user input indicating a first new task; updating a task list to comprise the first new task; providing an indication of the first new task to a remote vehicle of the set of vehicles; receiving, from the remote vehicle, an indication of an update to the first new task; and generating a display of the update to the first new task at an instrument cluster of the hub vehicle.

Clause 12. The method of clause 11, further comprising: receiving, from the remote vehicle, an indication of a second new task; and updating the task list to comprise the second new task.

Clause 13. The method of clause 12, wherein the remote vehicle is a first remote vehicle and the method further comprises: providing an indication of the update to the first new task to a second remote vehicle of the set of vehicles; and providing an indication of the second new task to the second remote vehicle.

Clause 14. The method of clause 11, wherein the user input indicating the first new task is received at the hub vehicle from a mobile computing device.

Clause 15. The method of clause 11, wherein: the method further comprises providing an indication to the remote vehicle that the first new task is assigned to the remote vehicle; and the update from the remote vehicle comprises an indication that the first new task has been completed.

Clause 16. A method for processing locations of a fleet of vehicles, the method comprising: receiving, from a first vehicle of the fleet of vehicles, first vehicle state information comprising a location of the first vehicle; receiving, from a second vehicle of the fleet of vehicles, second vehicle state information comprising a location of the second vehicle; generating a display comprising: a first vehicle representation based on the location of the first vehicle; and a second vehicle representation based on the location of the second vehicle; receiving user input associated with the first vehicle representation; and in response to the received user input, updating the display to comprise additional information associated with the first vehicle based on the first vehicle state information.

Clause 17. The method of clause 16, wherein the generated display further comprises a third vehicle representation based on a location of a hub vehicle of the fleet of vehicles.

Clause 18. The method of clause 16, wherein: the first vehicle state information comprises an indication of a power source state of the first vehicle; and the additional information associated with the first vehicle comprises the power source state of the first vehicle.

Clause 19. The method of clause 16, wherein the additional information further comprises a vehicle configuration associated with the first vehicle, and wherein the method further comprises: receiving user input comprising a change to the vehicle configuration of the first vehicle; and providing, to the first vehicle, and indication of the changed vehicle configuration.

Clause 20. The method of clause 19, wherein the vehicle configuration comprises at least one of a geofence for the first vehicle, an acceleration characteristic for the first vehicle, a speed characteristic for the first vehicle, a suspension characteristic for the first vehicle, or a power source reserve level for the first vehicle.

What is claimed is:

1. A method for operating a fleet of vehicles, the method comprising:
   receiving, from a first vehicle of the fleet of vehicles, first vehicle state information comprising a location of the first vehicle;
   receiving, from a second vehicle of the fleet of vehicles, second vehicle state information comprising a location of the second vehicle;
   determining a first geofence based upon the first vehicle location, each vehicle of the fleet of vehicles having restricted movement within the first geofence;
   determining a second geofence based upon an energy estimate of the second vehicle, the second vehicle having restricted movement within the second geofence;
   generating a display comprising:
   a first vehicle representation based on the location of the first vehicle; and
   a second vehicle representation based on the location of the second vehicle;
   receiving user input associated with the first vehicle representation;
   in response to the received user input, updating the display to comprise additional information associated with the first vehicle based on the first vehicle state information; and
   controlling the operation of the second vehicle within an area defined by an overlap of the second geofence based upon the energy estimate of the second vehicle with the first geofence based upon the first vehicle location.

2. The method of claim 1, wherein the generated display further comprises a third vehicle representation based on a location of a hub vehicle of the fleet of vehicles.

3. The method of claim 1, wherein:
   the first vehicle state information comprises an indication of a power source state of the first vehicle; and
   the additional information associated with the first vehicle comprises the power source state of the first vehicle.

4. The method of claim 1, wherein the additional information further comprises a vehicle configuration associated with the first vehicle, and wherein the method further comprises:
   receiving user input comprising a change to the vehicle configuration of the first vehicle; and
   providing, to the first vehicle, and indication of the changed vehicle configuration.

5. The method of claim 4, wherein the vehicle configuration comprises at least one of a geofence for the first vehicle, an acceleration characteristic for the first vehicle, a speed characteristic for the first vehicle, a suspension characteristic for the first vehicle, or a power source reserve level for the first vehicle.

6. The method of claim 1, wherein the energy estimate is based upon a terrain being traversed by the second vehicle.

7. The method of claim 1, further comprising:
   providing instructions from the first vehicle to the second vehicle for the second vehicle to return to the first vehicle; and
   operating the second vehicle to return to the location of the first vehicle.

8. The method of claim 1, wherein the energy estimate is an available range of travel of the second vehicle.

* * * * *